Sept. 17, 1963 A. G. MYRUM 3,104,037
FLOW CONTROLLER FOR STREAM OF SOLIDS
Filed Oct. 8, 1958 2 Sheets-Sheet 1

INVENTOR.
ANDOR G. MYRUM
BY Donald G. Dalton
ATTORNEY

Sept. 17, 1963  A. G. MYRUM  3,104,037
FLOW CONTROLLER FOR STREAM OF SOLIDS
Filed Oct. 8, 1958  2 Sheets-Sheet 2

INVENTOR.
ANDOR G. MYRUM
BY Donald G. Dalton
ATTORNEY

United States Patent Office 3,104,037
Patented Sept. 17, 1963

3,104,037
FLOW CONTROLLER FOR STREAM OF SOLIDS
Andor G. Myrum, Hibbing, Minn., assignor to United States Steel Corporation, a corporation of New Jersey
Filed Oct. 8, 1958, Ser. No. 765,985
7 Claims. (Cl. 222—406)

This invention relates to an improved device for controlling discharge of solid materials, such as ore, from a pan feeder, chute, hopper or the like.

The invention is an improvement over a device commonly known as a "Ross chain feeder," several forms of which are shown in Ross Patents Nos. 1,840,917, 1,901,002 and 2,296,953. A Ross chain feeder comprises essentially a plurality of endless chains and respective driven sprockets over which the chains run continuously. The chains are suspended over a discharge opening, where they travel with the material and maintain a relatively uniform flow. While such devices are effective and have widespread use, I have observed that some types of materials cause operating difficulties. Usually adjacent chains are welded to one another; consequently large chunks which often are present in unsized material can pass only by forcing the whole assembly of chains outwardly and permitting a surge of material to discharge. The lower ends of the chains form closed loops which sometimes catch material. Wet sticky material may cling and travel with the returning chains to the drive and possibly cause the chains to ride off their sprockets.

An object of the present invention is to provide an improved chain-type discharge-controlling device which overcomes the foregoing difficulties, that is, in which the chains can spread sideways to pass large chunks and they are free of loops and cannot carry clinging material back to the drive.

A further object is to provide a device of the foregoing type in which the chains reciprocate, rather than traveling around continuous orbits.

A more specific object is to provide a device of the foregoing type in which the individual chains are single strand and free of one another, and adjacent chains reciprocate in opposite directions, thereby eliminating any loops or continuous return travel.

In accomplishing these and other objects of the invention, I have provided improved details of structure, preferred forms of which are shown in the accompanying drawings, in which.

Figure 1:
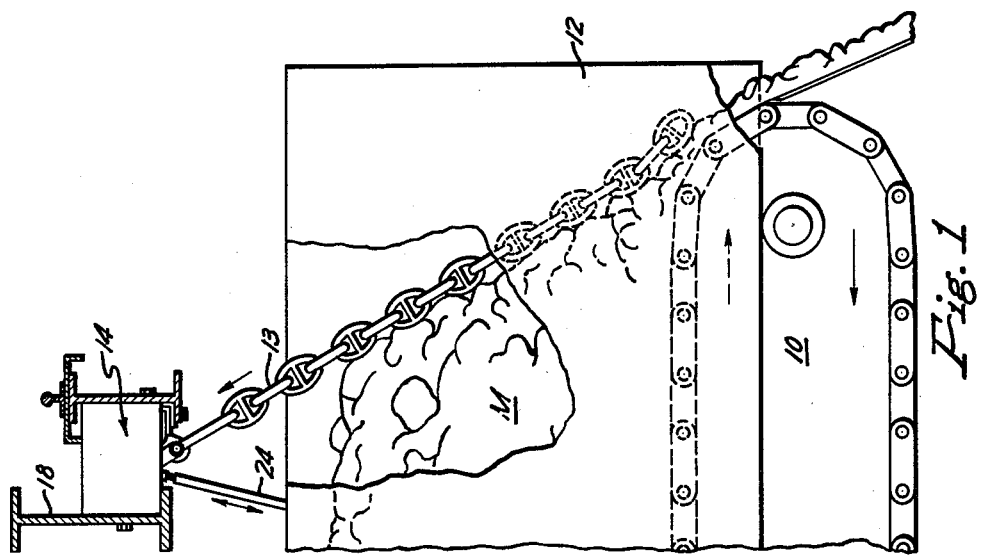
FIGURE 1 is a side elevational view, with parts broken away, showing a hopper and pan feeder equipped with a control device in accordance with my invention.
Figure 2:
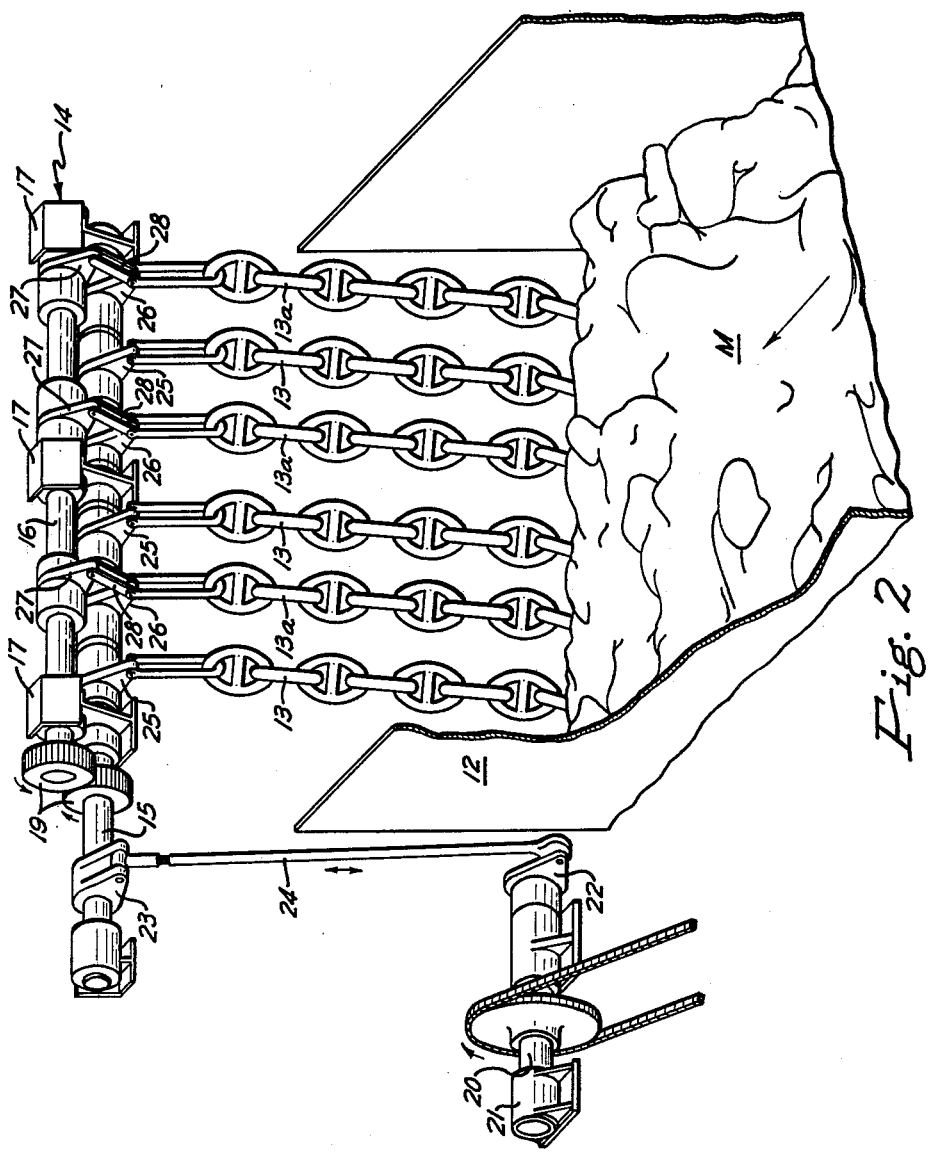
FIGURE 2 is a perspective view from inside the hopper to show the driving means for my control device.

FIGURES 1 and 2 show somewhat diagrammatically portions of a conventional pan feeder 10 and hopper 12 for handling unsized bulk material M, such as iron ore. The pan feeder is driven continuously by any suitable means, not shown, to carry material from the hopper. My control device comprises a plurality of individual single strand chains 13 and 13a which lie on the surface of the material at the discharge end of the pan feeder. The chains are suspended from any suitable drive 14 which can reciprocate chains 13 and 13a in opposite directions; that is, alternating chains 13 move upwardly while the other alternating chains 13a move downwardly, and vice versa.

The drive 14 illustrated includes a main rocker shaft 15 and a parallel auxiliary rocker shaft 16 (FIGURE 2).

Shafts 15 and 16 are journaled in bearings 17, which can be carried by any suitable structural members, such as beams 18. A pair of spur gears 19 connect the two shafts, whereby oscillation of the main shaft 15 oscillates the auxiliary shaft 16 through an equivalent arc, but always in the opposite direction. The mechanism for oscillating the shafts includes a crankshaft 20 journaled in suitable bearings 21, crank arms 22 and 23 on the crankshaft 20 and rocker shaft 15 respectively, and a pitman 24 pivoted to the two crank arms. The crankshaft is continuously driven, preferably from the drive for the pan feeder. Actuating arms 25 are keyed to the main rocker shaft, and idler arms 26 are rotatably mounted thereon, alternating with each other. Actuating arms 27 are keyed to the auxiliary rocker shaft 16 above the respective idler arms 26 and connected thereto through links 28. Chains 13 and 13a are attached to the actuating arms 25 and idler arms 26 respectively, whereby they lie in approximately the same plane.

Figure 3:
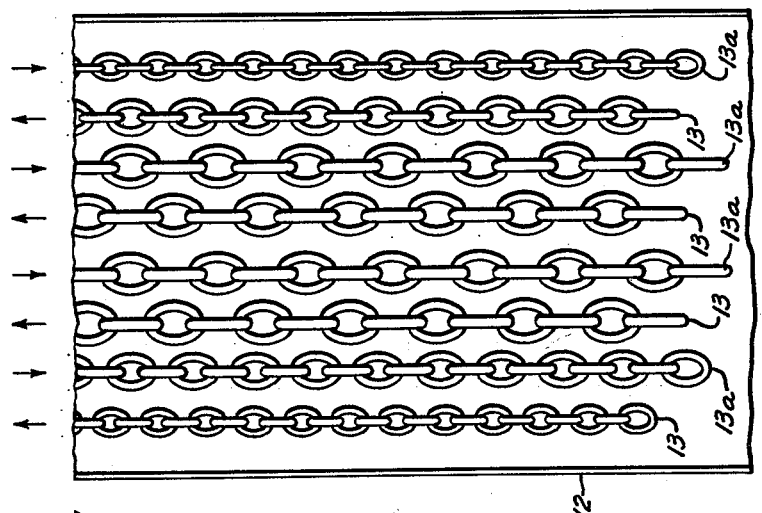
FIGURE 3 is a front elevation showing a modification.
Figure 4:
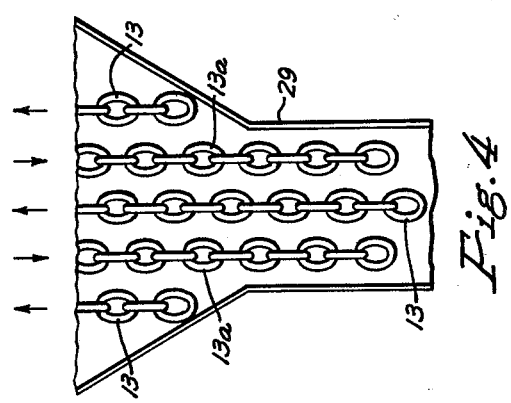
FIGURE 4 is a front elevation showing another modification.

FIGURE 3 shows diagrammatically a modification in which the chains 13 and 13a located at the midportion of the group are heavier than those at either side. The heavier chains tend to feed more material than the lighter chains and thus concentrate the load along the center line of a subsequent conveyor. FIGURE 4 shows another modification in which the device is used to control discharge through a tapered chute 29. In this instance the chains at the sides are shorter to fit the taper. The advantages of these modifications are not possible with Ross chain feeders if the chains are welded together.

From the foregoing description it is seen that my invention affords a control device that effectively overcomes difficulties encountered with previous devices of similar type. The chains in my device hold back material or push it along as required to maintain a uniform flow, yet they are free to spread to pass large chunks and they cannot carry clinging material back to the drive. The chains moving down at any instant substantially balance the weight of those moving up, whereby power requirements are small.

While I have shown and described certain preferred embodiments of my invention, it is apparent that modifications may arise. Therefore, I do not wish to be limited to the disclosure set forth but only by the scope of the appended claims.

I claim:

1. The combination, with a source of solid material and means for discharging material from said source, of a control device for maintaining a substantially uniform discharge rate comprising a plurality of chains suspended over said discharge means, and drive means for reciprocating said chains lengthwise with at least one chain traveling in the opposite direction from another chain.

2. The combination, with a source of solid material and means for discharging material from said source, of a control device for maintaining a substantially uniform discharge rate comprising a plurality of chains suspended over said discharge means, and drive means for reciprocating alternating chains lengthwise in one direction and the other alternating chains lengthwise in the opposite direction.

3. The combination, with a source of unsized solid material and means for discharging material from said source, of a control device for maintaining a substantially uniform discharge rate comprising a plurality of single strand chains individually suspended over said discharge means, said chains being adapted to spread sideways to pass large chunks in the material, and drive means for reciprocating alternating chains in one direction, and the other alternating chains in the opposite direction.

4. A combination as defined in claim 3 in which said drive means includes a main rocker shaft, an auxiliary rocker shaft, means for oscillating said shafts in opposite directions, alternating actuating arms and idler arms carried by said main rocker shaft, said actuating arms being movable with the main rocker shaft and said idler arms being freely pivoted thereon, and means connecting said idler arms with said auxiliary rocker shaft for moving the idler arms therewith, alternating chains being suspended from said actuating arms and the other alternating chains being suspended from said idler arms.

5. A device for controlling discharge of solid material to maintain the discharge rate substantially uniform comprising a plurality of chains mounted for suspension over an opening through which the material discharges, and drive means for reciprocating alternating chains lengthwise in one direction and the other alternating chains lengthwise in the opposite direction.

6. A device for controlling discharge of solid material to maintain the discharge rate substantially uniform comprising a plurality of single strand chains individually mounted for suspension over an opening through which the material discharges, said chains being adapted to spread sideways to pass large chunks in the material, and drive means for reciprocating alternating chains in one direction and the other alternating chains in the opposite direction.

7. A device as defined in claim 6 in which said drive means includes a main rocker shaft, an auxiliary rocker shaft, means for oscillating said shafts in opposite directions, alternating actuating arms and idler arms carried by said main rocker shaft, said actuating arms being movable with the main rocker shaft and said idler arms being freely pivoted thereon, and means connecting said idler arms with said auxiliary rocker shaft for moving the idler arms therewith, alternating chains being suspended from said actuating arms and the other alternating chains being suspended from said idler arms.

References Cited in the file of this patent

UNITED STATES PATENTS

| | | |
|---|---|---|
| 1,462,119 | Moetteli | July 17, 1923 |
| 1,502,657 | Borcherdt | July 29, 1924 |
| 1,901,002 | Ross | Mar. 14, 1933 |
| 2,561,258 | Wolf et al. | July 17, 1951 |

FOREIGN PATENTS

| | | |
|---|---|---|
| 951,346 | Germany | Dec. 13, 1956 |